June 26, 1928.
D. L. BENTON
REAR BUMPER
Filed June 22, 1927
1,674,880
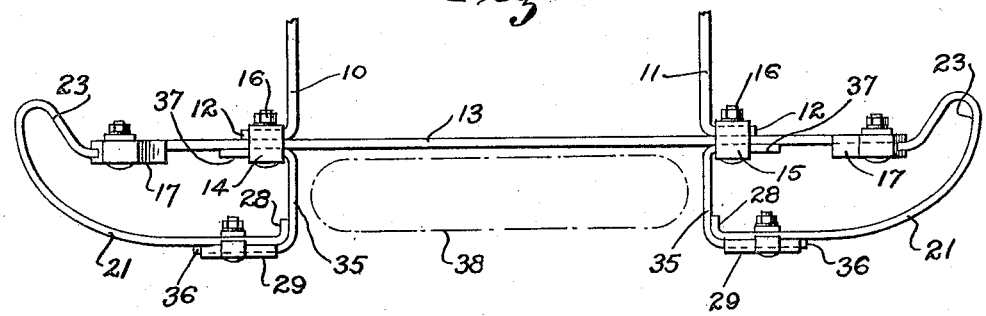
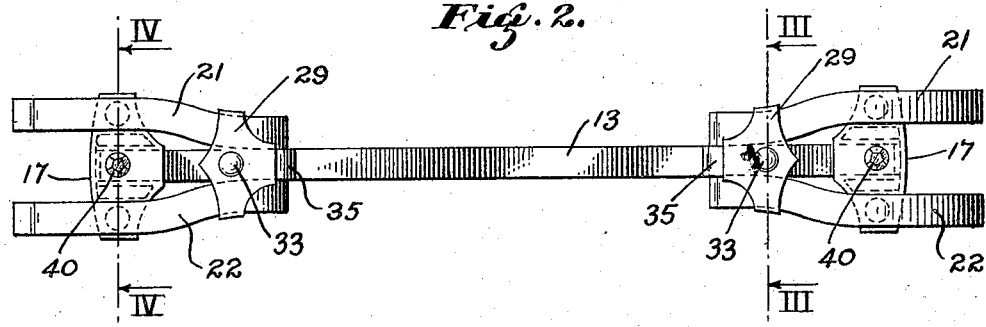
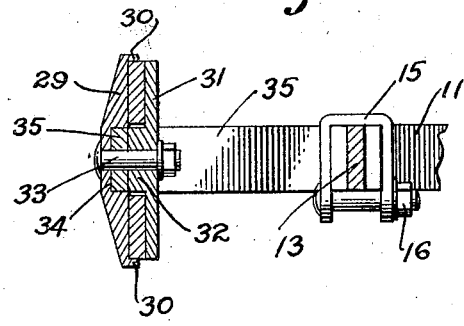
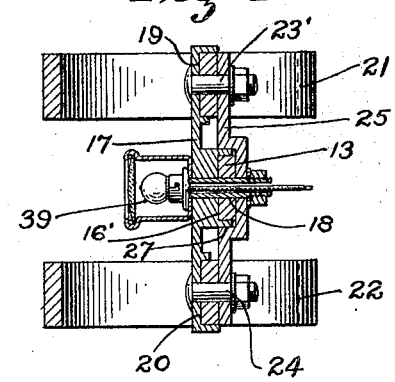
INVENTOR.
Donald L. Benton.
BY Townsend, Loftus & Abbett
ATTORNEYS.

Patented June 26, 1928.

1,674,880

UNITED STATES PATENT OFFICE.

DONALD L. BENTON, OF LOS ANGELES, CALIFORNIA, ASSIGNOR TO AMERICAN CHAIN COMPANY, INC., OF BRIDGEPORT, CONNECTICUT, A CORPORATION OF NEW YORK.

REAR BUMPER.

Application filed June 22, 1927. Serial No. 200,609.

This invention relates to automobile bumpers and particularly pertains to rear bumpers for automobiles. It is the principal object of the present invention to provide an automobile bumper structure especially adapted for mounting transversally of the rear of an automobile, and in conjunction with the spare tire usually carried at the rear of the car, the structure being particularly concerned with a pair of bumper tips adapted to be disposed on opposite sides of the spare tire to protect the rear mud guards, and which tips are of a design permitting them to effectively absorb shock of impact, and at the same time being fitted with illuminating means adapted to serve as warning or tail lights for the rear of the car.

The present invention contemplates the use of a transversely extending bumper bar, adapted to be secured across the rear of an automobile by suitable brackets fixed to the automobile frames, said back bar carrying looped bumper tips formed of resilient material, and serving as protectors of the mud guards of the rear wheels, the back bar further being fitted with illuminating means which are protected by the impact sections of the bumper tips while being visible from the rear of the car.

The invention is illustrated by way of example in the accompanying drawings, in which:

Fig. 1 is a view in plan, showing the bumper structure with which the present invention is concerned.

Fig. 2 is a view in rear elevation, showing the bumper disclosed in Fig. 1.

Fig. 3 is a view in transverse section through one of the bumper tips, as shown on the line 3—3 of Fig. 2.

Fig. 4 is a view in transverse section through one of the bumper tips, as shown on the line 4—4 of Fig. 2.

Referring more particularly to the drawing, Figs. 10 and 11 indicate brackets by which the bumper structure may be mounted upon the rear of an automobile. These brackets are so designed as to be adapted to a particular make of car, and are fitted with any desired means by which they may be fastened to the frame elements of the automobile. As here shown, the brackets turn outwardly at their free ends, and terminate in portions 12, against which a transversely extending back bar, 13, is secured by clasps 14 and 15. These clasps are of U shape, and are fastened around the bars, and clamped by bolts 16.

The outer ends of the back bar 13, terminate in the rear of the mud guards, provided for the rear wheels of the vehicle. These outer ends are seated within recesses 16', of connecting plates 17. These plates extend transversely and are fastened to the ends of the back bar 13, by bolts 18. The plates are formed at their upper and lower ends with recessed portions 19 and 20, which receive the rear ends of impact bars 21 and 22. As shown in Fig. 1, the impact bars 21 and 22 are formed with recurved loops 23, and since the impact bars 21 and 22 are made of resilient material, it is evident that force delivered to the face of the impact bars, or force imparted by hooking action on the loops, will be absorbed as the loops and the bars flex.

The rear terminating portions of the impact bars 21 and 22 which are disposed in the seats 19 and 20 of the connecting bars 17, are secured in position by bolts 23' and 24, as shown in Fig. 4. These bolts also pass through clamp plates 25, which are secured against the forward face of each of the bars 13, 21 and 22, and act to hold the bars in their seated positions upon the plates 17. It will also be noted that the plates 25 are offset so that a seat 27 is formed within which the seat-structure 16' of the plate 17 may extend and be firmly held, thereby causing the plates 17 and 25 to be interlocked, thus preventing them from becoming displaced with relation to each other or the bumper bars.

The impact portions of the bars 21 and 22 curve rearwardly and then inwardly from the loops 23, and then terminate in hooked ends, 28, as shown in Fig. 1 of the drawing. It is to be understood that the impact portions of the bars 21 and 22 are in the same vertical plane.

Connecting plates 29 are secured across the back face of the bars 21 and 22, to hold them in position as indicated, particularly in Fig. 3 of the drawing. These plates are formed at the upper and lower edges with lips 30, which extend along the upper and lower edges of bars 21 and 22 respectively, and prevent these bars from becoming separated.

A back plate 31, is disposed upon the opposite sides of the two bars, and is formed with a central projection 32, which extends between the two bars and supplements the lips 30 in preventing vertical displacement of the bars.

Bolts, 33, extend through the plates 29 and 31 and clamp the plates together.

Attention is directed to the fact that Fig. 3 shows the plate 29 with a central recess or seat 34. This seat accommodates a short bar 35, which is U shaped, and forms a connection between the otherwise free ends of the impact bars 21 and 22 and the back bar 13. One leg 36, of the U shaped member 34, is positioned within the seat, while the other leg, indicated at 37, is embraced by the clamp member 15, and may be adjustably held for longitudinal movement relative to the back bar 13. The connecting bars 35 thus extend parallel to each other, and longitudinally of the vehicle and upon opposite sides of a spare tire, 38. It will be evident that in the event the sizes of spare tires vary, the bars 35 may be adjusted toward or away from each other, to accommodate the tire, and to ensure that the bumper tip structures will effectively supplement the tire in protecting the rear of the vehicle from impact shock and damage.

In the operation of an automobile it is highly desirable that adequate protection may be afforded the car from the rear, by providing warning lights which will not only serve the purpose of the usual tail light, but will assist approaching drivers in delineating the rear of the vehicle, and especially the width of the car. This is accomplished in the present case by mounting small electric lights 39, or illuminating jewels 40, upon the fastening places 17, carried by the back bar, as more particularly disclosed in my co-pending application Serial No. 200,610 filed concurrently herewith. In this manner the illuminating means will be disclosed to view at the rear of the vehicle, and between the bumper bars 21 and 22. At the same time, the bumper bars will protect the illuminating means and minimize the possibility of damage to the illuminating means in the case of collision. It will thus be seen that the invention here disclosed provides a strong protecting bumper for the rear of an automobile, and at the same time affords illuminating means therefor.

While I have shown the preferred form of my invention, as now known to me, it is understood that various changes may be made in the combination, construction and arrangement of parts without departing from the spirit of the invention as claimed.

Having thus described my invention, what I claim as new and desire to secure by Letters Patent is:

1. An automobile bumper structure comprising a back bar extended transversely of an automobile frame, and carried thereby; a pair of bumper tips secured to the opposite ends of the back bar, and supported in a manner to protect the two fenders of an automobile upon which the bumper is mounted, and means whereby the length of the tips may be adjustably varied.

2. An automobile bumper structure comprising a transversely extending back bar, means for securing the same upon an automobile, plates fastened to the ends of said back bar, and extending vertically upon opposite sides thereof; loop end bumper bars rigidly secured at one end to the plates, their opposite ends extending rearwardly, and then inwardly to provide impact sections, and means connecting said rearwardly and inwardly extending ends to the back bar, at points intermediate the first named connections for said bars.

3. An automobile bumper structure comprising a back bar, means securing said back bar transversely of an automobile; a pair of vertically aligned parallel bumper bars, at each end of the back bar, and having recurved portions rigidly attached to the ends thereof, and supplemental bar members adjustably securing the free ends of said bumper bars to the back bar.

4. An automobile bumper structure comprising a back bumper bar, means securing the same transversely of the rear of an automobile, a pair of looped bumper bars disposed adjacent each end of said back bar, and spaced parallel to each other in a vertical plane; connecting plates, one carried at each end of the back bar, means for rigidly securing the recurved ends of the pairs of bumper bars to the connecting plates upon opposite ends of the back bar, and means for securing the opposite ends of said bumper bars to the back bar.

5. An automobile bumper structure comprising a back bumper bar, means securing the same transversely of the rear of an automobile, a pair of looped bumper bars disposed adjacent each end of said back bar, and spaced parallel to each other in a vertical plane; connecting plates, one carried at each end of the back bar, means for rigidly securing the recurved ends of the pair of bumper bars to the connecting plates upon opposite ends of the back bar; U shaped bars, one for each pair of bumper bars, and means for adjustably securing said U shaped members to the free ends of the pairs of bumper bars, and to the back bar, whereby the length of the back bars may be varied.

DONALD L. BENTON.